United States Patent
Kalakrishnan et al.

(10) Patent No.: US 10,960,539 B1
(45) Date of Patent: Mar. 30, 2021

(54) CONTROL POLICIES FOR ROBOTIC AGENTS

(71) Applicant: X Development LLC, Mountain View, CA (US)

(72) Inventors: Mrinal Kalakrishnan, Palo Alto, CA (US); Ali Hamid Yahya Valdovinos, Palo Alto, CA (US); Adrian Ling Hin Li, San Francisco, CA (US); Yevgen Chebotar, Los Angeles, CA (US); Sergey Vladimir Levine, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 772 days.

(21) Appl. No.: 15/705,655

(22) Filed: Sep. 15, 2017

Related U.S. Application Data

(60) Provisional application No. 62/395,229, filed on Sep. 15, 2016.

(51) Int. Cl.
*B25J 9/16* (2006.01)
*G05B 13/02* (2006.01)

(52) U.S. Cl.
CPC ............ *B25J 9/163* (2013.01); *G05B 13/027* (2013.01); *G05B 2219/33333* (2013.01); *G05B 2219/39164* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,630,316 | B2 * | 4/2017 | Konolige | B25J 9/1612 |
| 10,035,264 | B1 * | 7/2018 | Kalakrishnan | G05D 1/0223 |
| 10,058,995 | B1 * | 8/2018 | Sampedro | B25J 9/163 |
| 10,427,296 | B1 * | 10/2019 | Sampedro | B25J 9/163 |
| 10,748,057 | B1 * | 8/2020 | Li | G06N 3/0454 |
| 10,773,382 | B2 * | 9/2020 | Bai | B25J 9/1612 |

(Continued)

OTHER PUBLICATIONS

Chebotar et al. "Learning robot tactile sensing for object manipulation," IEE/RSJ International Conference on Intelligent Robots and Systems, Sep. 2014, 8 pages.

(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on computer storage media, of training a global policy neural network. One of the methods includes initializing a plurality of instances of the robotic task. For each instance of the robotic task, the method includes generating a trajectory of state-action pairs by selecting actions to be performed by the robotic agent while performing the instance of the robotic task in accordance with current values of the parameters of the global policy neural network, and optimizing a local policy controller that is specific to the instance on the trajectory of state-action pairs for the instance. The method further includes generating training data for the global policy neural network using the local policy controllers, and training the global policy neural network on the training data to adjust the current values of the parameters of the global policy neural network.

20 Claims, 4 Drawing Sheets

(56) References Cited

U.S. PATENT DOCUMENTS

| | | | |
|---|---|---|---|
| 10,861,184 B1* | 12/2020 | Kalakrishnan | G06T 7/60 |
| 2008/0319929 A1* | 12/2008 | Kaplan | G06N 3/004 |
| | | | 706/14 |
| 2017/0371675 A1* | 12/2017 | Chen | G06F 9/3867 |

OTHER PUBLICATIONS

Chebotar et al. "Self-supervised regrasping using spatio-temporal tactile features and reinforcement learning," IEEE/RSJ International Conference on Intelligent Robots and Systems, Oct. 9, 2016, 7 pages.

Deisenrith et al. "A survey on policy search for robotics," Foundations and Trends in Robotics, 2(1-2), Aug. 2013, 16 pages [Content, Abstract, and Introduction].

Deisenroth et al. "Learning to control a low-cost manipulator using date-efficient reinforcement learning," In Robotics: Science and Systems, vol. 7, Jan. 2012, 8 pages.

Endo et al. "Learning cpg-based biped locomotion with a policy gradient method: Application to a humanoid robot," Int. Journal of Robotic Research, 27(2), Feb. 2008, 16 pages.

Englert et al. "Combined optimization and reinforcement learning for manipulation skills," Robotics: Science and Systems, 2016, 9 pages.

Fukushima. "Neocognition: A Self-organizing neural network model for a mechanism of pattern recognition unaffected by shift in position," Biological Cybernetics, 36, Jan. 1980, 10 pages.

Gomez et al. "Policy search for path integral control," Joint European Conference on Machine Learning and Knowledge Discovery in Databases, Sptinger, Berlin, Heidelberg, Sep. 15, 2014, 16 pages.

Hinterstoisser et al. "Going further with point pair features," European Conference on Computer Vision, Oct. 8, 2016, 15 pages.

Ijspeert et al. "Movement imitation with non-linear dynamical systems in humanoid robots," IEEE International Conference on Robotics and Automation, vol. 2, 2002, 6 pages.

Kalakrishnan et al. "Learning force control policies for compliant manipulation," IEEE/RSJ International Conference on Intelligent Robots and Systems, Sep. 2011, 6 pages.

Kober et al. "Learning perceptual coupling for motor primitives," International Conference on Intelligent Robots and Systems, Sep. 2008, 6 pages.

Kober et al. "Reinforcement learning to adjust robot movements to new situations," Proceedings of the International Joint Conference on Artificial Intelligence, vol. 22(3), Jul. 2011, 6 pages.

Kohl et al. "Policy gradient reinforcement learning for fast quadrupedal locomotion," IEEE International Conference on Robotics and Automation, May 2004, 6 pages.

Koutnik et al. "Evolving deep unsupervised convolutional networks for vision-based reinforcement learning," Proceedings of the Annual Conference on Genetic and Evolutionary Computation, Jul. 12, 2014, 8 pages.

Levine et al. "End-to-End Training of Deep Visumotor Policies," arXiv 1504.00702v5, Apr. 19, 2016, 40 pages.

Levine et al. "Guided policy search," Proceedings of the $30^{th}$ International Conference on Machine Learning, , 2013, 9 pages.

Levine et al. "Learning contact-Rich Manipulation Skills with Guided Policy Search," arXiv 1501.05611v2, Feb. 26, 2015, 8 pages.

Levine et al. "Learning neural network policies with guided policy search under unknown dynamics," Advances in Neural Information Processing Systems, 2014, 9 pages.

Lillicrap et al. "Continuous control with deep reinforcement learning," arXiv 1509.02971v5, Feb. 29, 2016, 14 pages.

Lioutikov et al. "Sample-based informational-theoretic stochastic optimal control," IEEE International Conference on Robotics and Automation, May 31, 2014, 7 pages.

Montgomery et al. "Guided policy search as approximate mirror descent," arXiv 1607.04614, Jul. 2016, 14 pages.

Pastor et al. "Learning and generalization of motor skills by learning from demonstration," in IEEE international Conference on Robotics and Automation, May 12, 2009, 6 pages.

Peters et al. "Relative entropy policy search ," AAAI, Jul. 2010, 6 pages.

Schmidhuber et al. "Deep learning in neural networks: An overview," arXiv 1404.7828v4, Oct. 8, 2014, 88 pages.

Schulman et al. "Trust region policy optimization," Proceedings of the $32^{nd}$ International Conference on Machine Learning, 2015, 9 pages.

Stulp et al. "Learning to grasp under uncertainty," IEEE International Conference on Robotics and Automation, May 2011, 6 pages.

Stulp et al. "Path integral policy improvement with covariance matrix adaption," Proceedings of the $29^{th}$ International Conference on Machine Learning, 2012, 8 pages.

Stulp et al. "Reinforcement learning with sequences of motion primitives for robust manipulation," IEEE Trans. Robotics, 28(6) Dec. 2012, 13 pages.

Tedrake et al. "Stochastic policy gradient reinforcement learning on a simple 3d biped." IEEE International Conference on Intelligent Robots and Systems, Oct. 2004, 6 pages.

Theodorou et al. "A generalized path integral control approach to reinforcement learning," Journal of Machine Learning Research, 11, Nov. 2010, 45 pages.

Tompson et al. "Joint training of a convolutional network and a graphical model for human pose estimation," Advances in neural Information Processing Systems, 2014, 9 pages.

Van Hoof et al. "Learning on non-parametric control policies with high-dimensional state features," Artificial Intelligence and Statistics, Feb. 21, 2015, 9 pages.

Yahya et al. "Collective robot reinforcement learning with distributed asynchronous guided policy search," arXiv 1610.00673, Oct. 3, 2016, 8 pages.

\* cited by examiner

CONTROL POLICIES FOR ROBOTIC AGENTS

CROSS-REFERENCE TO RELATED APPLICATION

This application claims the benefit under 35 U.S.C. 119 of Provisional Application No. 62/395,229, filed Sep. 15, 2016, which is incorporated herein by reference.

BACKGROUND

This specification relates to selecting actions to be performed by a robotic agent.

Robotic agents interact with an environment by receiving data characterizing a state of the environment, and in response, performing an action in order to attempt to perform a robotic task. Some robotic agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to selecting actions to be performed by a robotic agent.

The subject matter described in this specification can be implemented in particular embodiments so as to realize one or more of the following advantages. An action selection system can effectively and directly learn complex feedback control policies that map from high-dimensional sensory inputs to motor torques for manipulation tasks with discontinuous contact dynamics, i.e., by training a global policy neural network as described in this specification. In particular, by training the global policy neural network as described in this specification, the action selection system can effectively learn an action selection policy even for contact-rich tasks that require fine action control. Additionally, the action selection system can learn an effective policy both from observations that are low-dimensional observations and from observations that are high-dimensional pixel inputs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes an action selection system that selects actions to be performed by a robotic agent interacting with a real-world environment to perform a robotic task, such as opening or closing a door, picking up an object and placing it down, and so on. In some examples, the robotic task can have discontinuous dynamics, i.e., the dynamics of the environment are discontinuous at certain states of the environment. In order to interact with the environment, the agent receives data characterizing the current state of the environment and performs an action in response to the received data.

The action selection system uses a global policy neural network to select actions to be performed by the robotic agent interacting with the real-world environment. The global policy neural network is configured to receive as input an observation, i.e., data characterizing a state of the environment, and to process the observation to generate a global policy output in accordance with current values of the parameters of the global neural policy neural network. The global policy output defines a distribution over possible actions to be performed by the agent in response to the observation.

Figure 1:
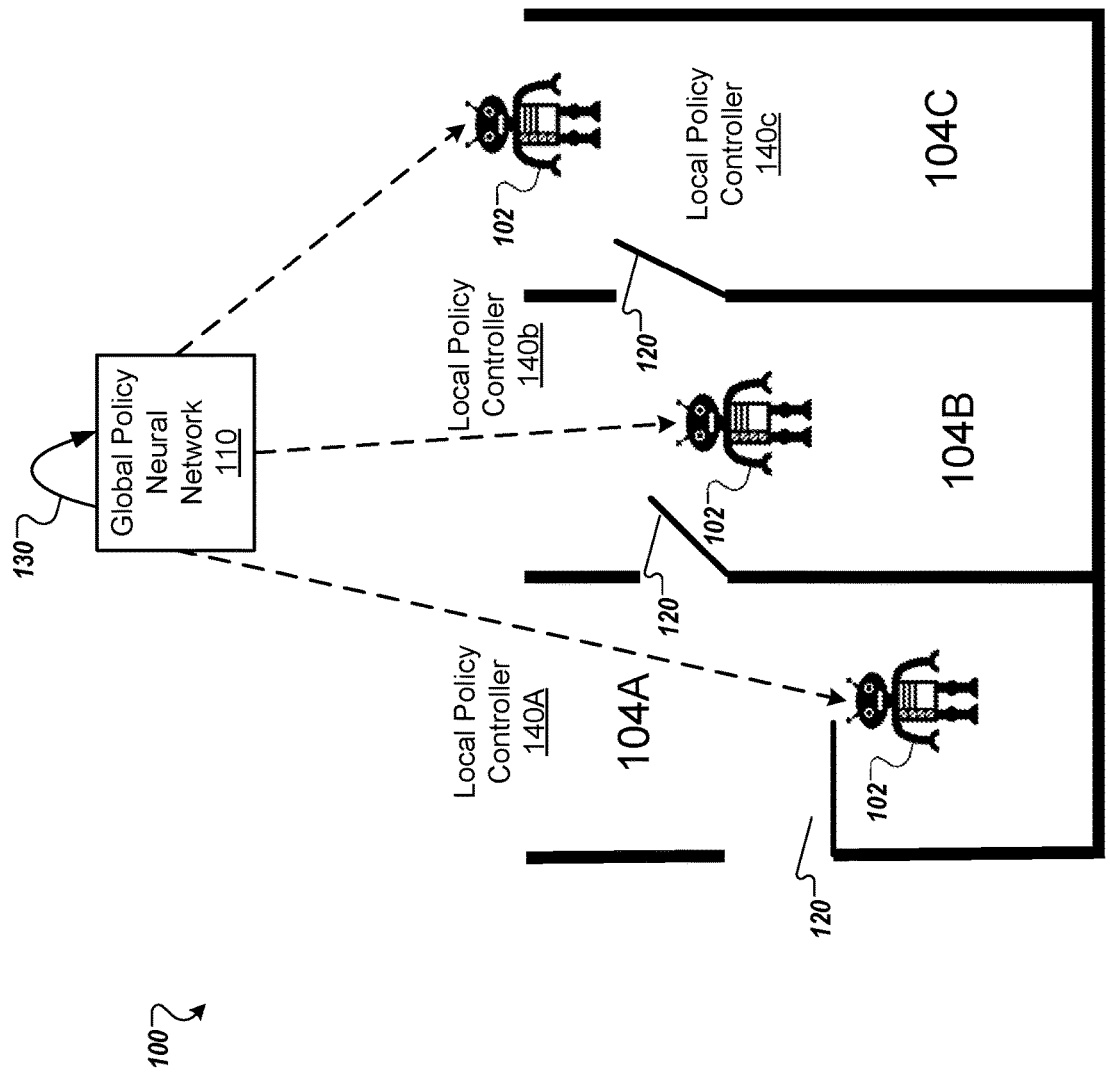
FIG. 1 shows an example environment for training a global policy neural network.

FIG. 1 shows an example of an environment 100 for training a global policy neural network 110.

In particular, the environment 100 shows a robotic agent 102 performing multiple instances 104A-104C of a robotic task during the training of a global policy neural network 110. In the example of FIG. 1, the robotic task is closing a door 120. As can be seen from FIG. 1, each instance 104A-104C has different, e.g., randomly selected or user-specified, initial conditions. In particular, in each instance 104A-104C, the door 102 is in a different position and the robotic agent 102 is initially located in a different location relative to the door 120.

As part of training the global policy neural network 110, an action selection system selects actions to be performed by the robotic agent 102 while carrying out the instances 104A-C of the door opening task. In particular, the action selection system selects actions using the global policy neural network 110. Selecting actions will be described in more detail below with reference to FIGS. 2 and 3.

The action selection system then updates 130 the values of the parameters of the global policy neural network 110 based on the agent 102 performing the task instances 104A-C.

In particular, rather than directly optimize the global policy neural network 110, the action selection system first optimizes a respective local policy controller 140a-140c for each instance 104A-104C. Optimizing local policy controllers will be described in more detail below with reference to FIGS. 2-4.

The action selection system then uses the optimized local policy controllers 140A-140C to update 130 the values of the parameters of the global policy neural network 110. Updating the values of the parameters using optimized local policy controllers will be described in more detail below with reference to FIGS. 2-3.

Thus, as will be described in more detail below, the action selection system uses the global policy neural network 110 to select actions to be performed by the agent 102 during training, but does not directly optimize the global policy neural network 110 on the results of those actions.

Figure 2:
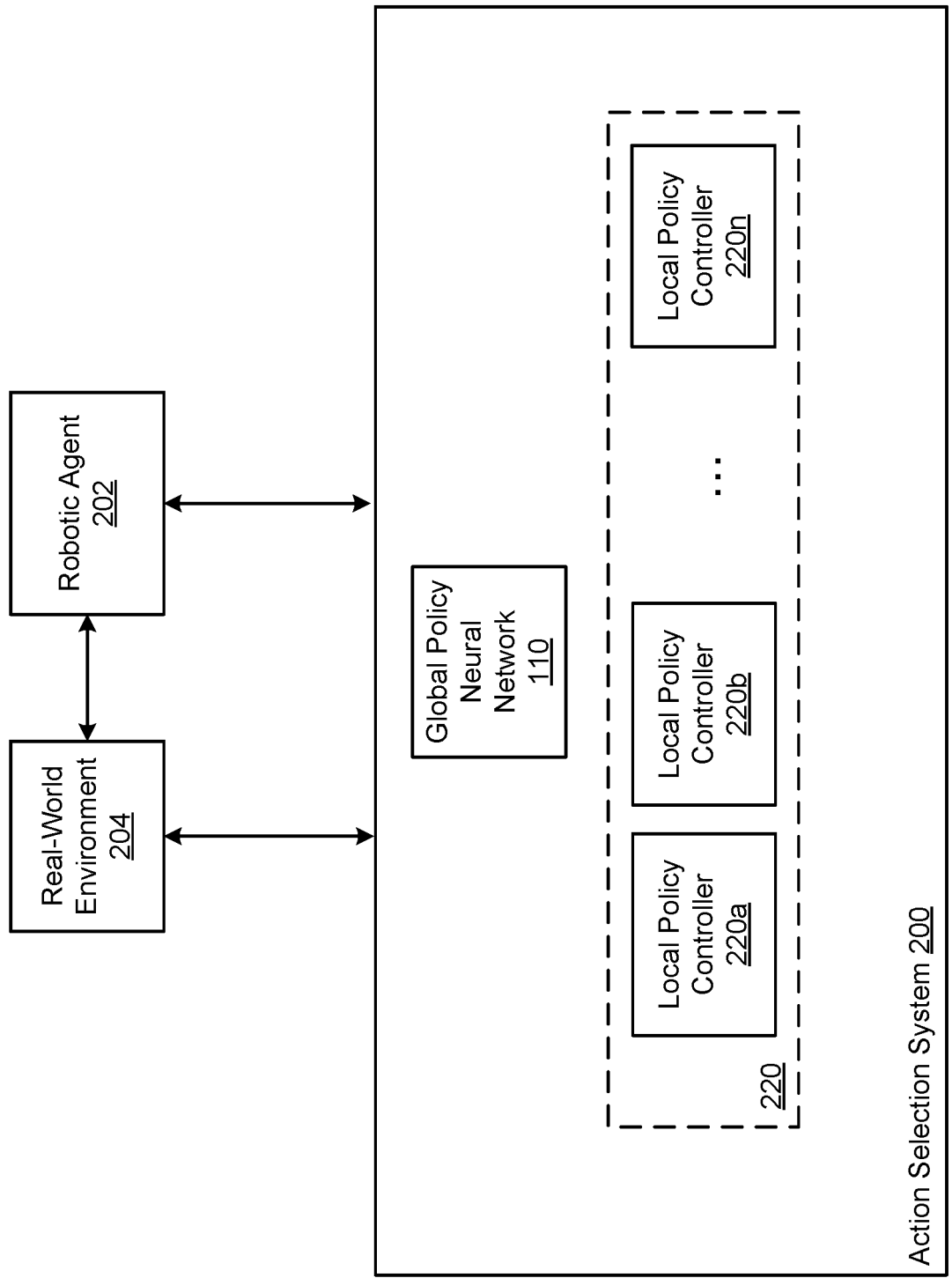
FIG. 2 shows an example action selection system.

FIG. 2 shows an example action selection system 200. The action selection system 200 is an example of a system implemented as computer programs on one or more computers in one or more locations in which the systems, components, and techniques described below are implemented.

The action selection system 200 selects actions to be performed by a robotic agent 202 interacting with a real-world environment 204. That is, the action selection system 200 receives observations, with each observation characterizing a respective state of the real-world environment 204, and, in response to each observation, generates a global policy output using the global policy neural network 110. In some examples, each observation includes raw sensor data captured by one or more sensors of the robotic agent 202, such as visual data, inertial measurement unit (IMU) readings, and so on.

The global policy neural network 110 is a neural network that is configured to receive an observation and to process the observation to generate a global policy output in accordance with current values of the parameters of the global policy neural network 110. The global policy output defines a probability distribution over a set of possible actions to be performed by the robotic agent 202. For example, the global policy output may include a mean action vector and covariances of the entries of the mean action vector. As an example, an action may include a respective torque to be applied to each of multiple joints of the robotic agent 202. In this example, the global policy output includes a mean action vector that includes a respective entry, i.e., a respective mean torque, for each joint and covariances of the entries of the mean action vector.

To allow the agent 202 to effectively interact with the real-world environment 204, the action selection system 200 trains the global policy neural network 110 to determine trained values of the parameters of the global policy neural network 110.

Generally, the action selection system 200 performs multiple iterations of a two-step training approach to train the global policy neural network 110.

Instead of directly learning the parameters of the global policy neural network 110, in the first step of the training approach the action selection system 200 uses a trajectory-centric algorithm to learn simple policy controllers, or local policy controllers, for trajectories with various initial conditions of the robotic task being performed by the robotic agent 202.

In particular, the action selection system 200 initializes multiple different instances of the particular robotic task, and for each one of these instances, the action selection system 200 generates a trajectory of state-action pairs by selecting actions to be performed by the robotic agent 202 while the robotic agent 202 is performing the instance of the particular robotic task. In particular, for each instance, the action selection system 200 selects the actions using the global policy neural network 110 and in accordance with the current values of the parameters of the global policy neural network 110.

Generally, different instances of a task are instances of the task that have different initial conditions. In some examples, the action selection system 200 can initialize different instances of a particular robotic task by randomly selecting an initial state of the task for each instance. For example, the system 200 can randomly select an initial position of an object, such as an initial rotation of the handle of a door, an initial position of a bottle on a table, etc., in the environment 204 that is being interacted with by the robotic agent 202. In some other examples, the initial state of the task for a new instance is generated by an external system or by a user.

The action selection system 200 then optimizes a respective local policy controller 220a-n for each instance. That is, for each instance, the action selection system 200 optimizes a controller that is specific to the instance on the trajectory of state-action pairs for the instance. For each instance, the local policy controller that is specific to the instance can be a time-varying linear-Gaussian controller. Each local policy controller 220a-n can generate a local policy output that defines a distribution over the possible actions based on low-dimensional data characterizing the state of the environment.

In the second step of the training approach, after optimizing the local policies of the local policy controllers 220a-n, the action selection system 200 uses the optimized controls from these policies to create a training set for learning a complex high-dimensional global policy in a supervised manner. That is, the action selection system 200 generates training data for the global policy neural network 110 using the optimized local policies 220 and trains the global policy neural network 110 on the training data to adjust the current values of the parameters of the global policy neural network 110, e.g., using supervised learning. The action selection system 200 can train the global policy neural network 110 using only observations of the full state of the real-world environment, and, thus, the global policy neural network 110 is able to predict actions from raw observations of the real-world environment 204.

The action selection system 200 can effectively use the global policy neural network 110 to select actions to be performed by the robotic agent 202 once the global policy neural network 110 has been trained. In particular, when an observation is received, the action selection system 200 can process the observation using the global policy neural network 110 to generate a global policy output in accordance with the trained values of the parameters of the global policy neural network 110. The action selection system 200 can then select a new action to be performed by the robotic agent 202 using the global policy output, i.e., by sampling an action from the distribution defined by the global policy output, and direct the robotic agent 202 to perform the new action in response to the observation.

In some implementations, the global policy neural network 110 includes a convolutional sub-network and a fully-connected sub-network.

The convolutional sub-neural network receives an image of the environment 204 captured by a camera of the robotic agent 202 and processes the image to generate multiple visual features in accordance with multiple convolutional parameters, i.e., by processing the image through multiple convolutional neural network layers. Optionally, the convolutional sub-network includes skip connections, pooling layers, or both.

The fully-connected sub-neural network receives the visual features from the convolutional sub-neural network and a robot state vector that characterizes a current state of the robotic agent 202 and processes the visual features and the robot state vector to generate the global policy output for the observation in accordance with multiple fully-connected parameters.

In some cases, the robot state vector includes data characterizing a position and a velocity of one or more components of the robotic agent 202. For example, the robot state vector can include data characterizing a position and a velocity of an arm, a grabber, etc., of the robotic agent 202.

The action selection system 200 can train the global policy neural network 110 on the training data to adjust the current values of the parameters of the global policy neural network 110 by, in some examples, adjusting current values of the fully-connected parameters while holding current values of the convolutional parameters fixed. In some other examples, the system 200 can train the global policy neural network 110 on the training data to adjust the current values of the parameters of the global policy neural network 110 by adjusting current values of the fully-connected parameters and current values of the convolutional parameters.

In some implementations, the system 200 pre-trains the convolutional sub-neural network with a proxy pose detection objective to determine pre-trained values of the convolutional parameters, i.e., prior to training the neural network 110 using the two-step approach.

Additionally, in some implementations, in addition to or instead of pre-training the convolutional sub-neural network, the system 200 pre-trains the neural network 110 on training data generated as a result of conventional global policy search with local policy sampling optimization performed on a fixed set of task instances.

Figure 3:
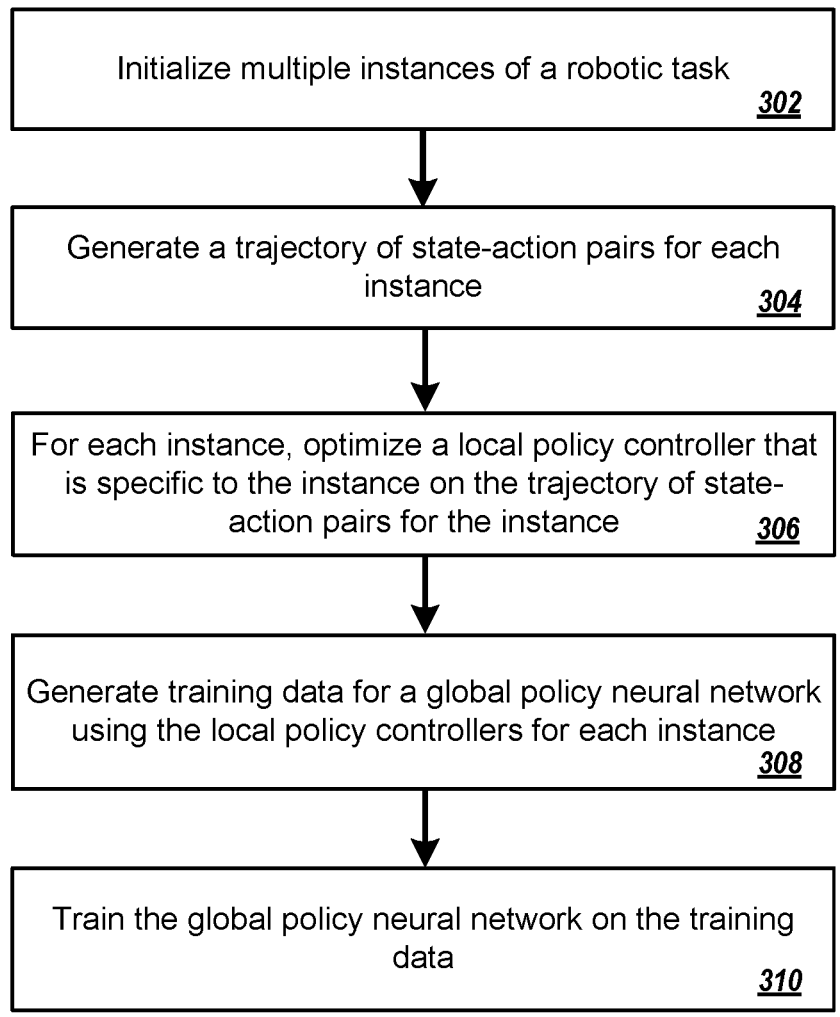
FIG. 3 is a flow diagram of an example process for training a global policy neural network.

FIG. 3 is a flow diagram of an example process 300 for training a global policy neural network. For convenience, the process 300 will be described as being performed by a system of one or more computers located in one or more locations. For example, an action selection system, e.g., the action selection system 200 of FIG. 2, appropriately programmed in accordance with this specification, can perform the process 300.

The system initializes multiple instances of a robotic task (step 302). As described above, each instance of the robotic task generally has different initial conditions for the task from each other task.

The system generates a trajectory of state-action pairs for each instance (step 304). The system can generate a trajectory of state-action pairs by selecting actions to be performed by the robotic agent while performing the instance of the task in accordance with current values of the parameters of the global policy neural network. That is, the system can receive a sequence of observations and, in response to each observation in the sequence, process the observation using the global policy neural network to generate a global policy output for the observation in accordance with current values of the parameters and then sample an action from the distribution defined by the global policy output. In some implementations, the system adds noise to the global policy output and then samples the action from the distribution defined by the noisy global policy output.

For each instance of the robotic task, the system optimizes a local policy controller that is specific to the instance on the trajectory of state-action pairs for the instance (step 306). Thus, although actions in a given trajectory are sampled from the high-dimensional global policy, the optimization for the trajectory is performed in a lower-dimensional action space with a trajectory-centric algorithm that can take advantage of the local trajectory structure. An example technique for optimizing a local policy controller that is specific to the instance on the trajectory of state-action pairs for the instance is described in more detail below with reference to FIG. 4.

The system generates training data for a global policy neural network using the optimized local policy controllers for each instance (step 308). The system can generate training data for the global policy neural network using the local policy controllers for each instance by determining a respective target global policy output for each of one or more of the states in the state-action pairs from the trajectory for the iteration using the optimized local policy controller for the instance. The target global policy output for a given state is the global policy output that should be generated by the global policy neural network by processing an observation characterizing the state. In particular, the target global policy output for a given state is the local policy output generated by the optimized local policy controller from processing the low-dimensional data characterizing the given state.

The system trains the global policy neural network on the generated training data (step 310). In particular, the system trains the global policy neural network on the generated training data using conventional supervised learning techniques. Thus, because the training data is generated as a result of optimizing local policy controllers, the training of the global policy neural network can take advantage of the local trajectory structure. However, because the global policy neural network is used to select the actions to generate the trajectory used to optimize the local policy controllers, the global policy neural network, once trained, can better generalize to various task conditions.

The system can repeatedly perform the process 300 until termination criteria for the training of the global policy neural network are satisfied to determine trained values of the parameters of the global policy neural network. For example, the system can perform the process 300 for a particular amount of time, until a certain number of iterations of the process 300 have been performed, or until the global policy neural network achieves a threshold level of performance on the robotic task.

In some cases, the system can repeat steps 304-310 of the process 300 multiple times on the same set of multiple instances of the task, i.e., before moving on to the next set of multiple instances. For example, the system can repeat steps 304-310 until the agent can reliably perform the task, i.e., successfully completes at least a threshold proportion of the task instances within a threshold number of actions. In some other cases, the system initializes a new set of multiple tasks after each time that step 310 of the process 300 has been completed.

Figure 4:
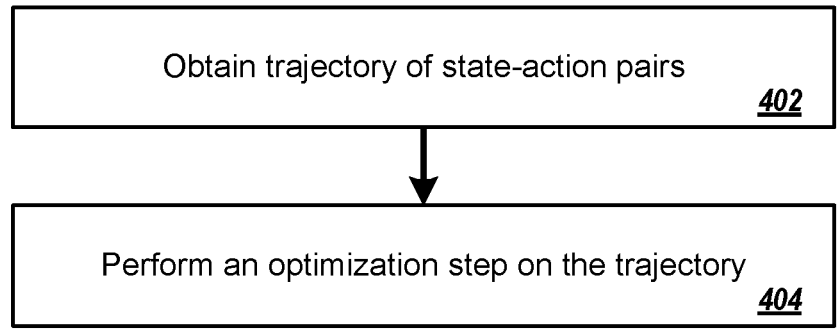
FIG. 4 is a flow diagram of an example process for optimizing a local policy controller.

FIG. 4 is a flow diagram of an example process 400 for optimizing a local policy controller. For convenience, the process 400 will be described as being performed by a system of one or more computers located in one or more locations. For example, an action selection system, e.g., the action selection system 200 of FIG. 2, appropriately programmed in accordance with this specification, can perform the process 400.

The system obtains a trajectory of state-action pairs generated as a result of the robotic agent performing an instance of the robotic task (step 402). In particular, the global policy neural network has been used to select the actions performed by the robotic agent in trajectory.

The system performs an optimization step of a local policy optimization algorithm on the trajectory of state-action pairs to optimize a local policy controller (step 404). For example, the local policy controller can be a time-varying linear Gaussian controller. The local policy optimization algorithm can be any appropriate trajectory optimization algorithm. For example, the trajectory optimization algorithm can be a policy improvement with path integrals (PI2) algorithm. Performing an optimization step using the PI2 is described in more detail in F. Stulp and O. Sigaud. Path integral policy improvement with covariance matrix adaptation. In ICML, 2012 As another example, the trajectory optimization algorithm can be a linear-quadratic regulators (LQR) algorithm. Performing an optimization step using an LQR algorithm is described in more detail in S.

Levine, C. Finn, T. Darrell, and P. Abbeel. End-to-end training of deep visuomotor policies. JMLR, 17(1), 2016.

In some cases, the trajectory optimization algorithm imposes a constraint on the optimized local policy controller that the outputs generated by the optimized local policy controller not deviate too strongly from outputs generated by an earlier version of the local policy controller. In these implementations, the system can instead impose the constraint that outputs generated by the optimized local policy controller not deviate too strongly from outputs generated by the global policy neural network in accordance with the current values of the network parameters. For example, the optimization can be constrained against KL-divergence to the outputs generated by the global policy neural network in accordance with the current values of the network parameters, e.g., by including in the optimization function for the trajectory optimization algorithm a KL-divergence term between the outputs generated by the local policy controller and the outputs generated by the global policy neural network in accordance with the current values of the network parameters. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a global policy neural network used to select actions to be performed by a robotic agent interacting with a real-world environment to perform a robotic task,
   wherein the global policy neural network is configured to receive as input an observation characterizing a state of the environment and to generate a global policy output in accordance with current values of a plurality of parameters, and
   wherein the method comprises:
      initializing a plurality of instances of the robotic task, comprising randomly selecting a respective initial state of the environment for each instance;
      for each instance:
         generating a trajectory of state-action pairs by selecting actions to be performed by the robotic agent while performing the instance of the robotic task in accordance with current values of the parameters of the global policy neural network, and
         optimizing a local policy controller that is specific to the instance on the trajectory of state-action pairs for the instance;

generating training data for the global policy neural network using the local policy controllers; and training the global policy neural network on the training data to adjust the current values of the parameters of the global policy neural network.

2. The method of claim 1, wherein optimizing the local policy controller that is specific to the instance on the trajectory of state-action pairs for the instance comprises:

performing an optimization step with path integral stochastic optimal control on the trajectory of state-action pairs for the instance.

3. The method of claim 1, wherein optimizing the local policy controller that is specific to the instance on the trajectory of state-action pairs for the instance comprises:

performing an optimization step using a linear quadratic regulator on the trajectory of state-action pairs for the instance.

4. The method of claim 1, wherein, for each instance, the local policy controller that is specific to the instance is a time-varying linear-Gaussian controller.

5. The method of claim 1, wherein each local policy controller receives low-dimensional data characterizing a state of the environment and generates a local policy output.

6. The method of claim 5, wherein each observation is high-dimensional data characterizing the state of the environment.

7. The method of claim 6, wherein each observation includes raw sensor data captured by one or more sensors of the robotic agent.

8. The method of claim 7, wherein the global policy neural network comprises:

a convolutional sub-neural network configured to receive an image of the environment captured by a camera of the robotic agent and to process the image to generate a plurality of visual features in accordance with a plurality of convolutional parameters; and a fully-connected sub-neural network configured to receive the visual features and a robot state vector that characterizes a current state of the robotic agent and to process the visual features and the robot state vector to generate the global policy output for the observation in accordance with a plurality of fully-connected parameters.

9. The method of claim 8, wherein the robot state vector comprises data characterizing a position and a velocity of one or more components of the robotic agent.

10. The method of claim 8, wherein training the global policy neural network on the training data to adjust the current values of the parameters of the global policy neural network comprises:

adjusting current values of the fully-connected parameters while holding current values of the convolutional parameters fixed.

11. The method of claim 8, wherein training the global policy neural network on the training data to adjust the current values of the parameters of the global policy neural network comprises:

adjusting current values of the fully-connected parameters and current values of the convolutional parameters.

12. The method of claim 8, further comprising:

pre-training the convolutional sub-neural network with a proxy pose detection objective to determine pre-trained values of the convolutional parameters.

13. The method of claim 1, wherein the global policy output defines a distribution over a plurality of possible actions.

14. The method of claim 13, wherein generating a trajectory of state-action pairs by selecting actions to be performed by the robotic agent while performing the instance of the task in accordance with current values of the parameters of the global policy neural network comprises:

receiving a sequence of observations and, in response to each observation:

processing the observation using the global policy neural network to generate a global policy output for the observation that defines a distribution over the plurality of possible actions in accordance with current values of the parameters; and sampling an action to be performed by the robotic agent in response to the observation from the distribution defined by the global policy output.

15. The method of claim 1, wherein generating training data for the global policy neural network using the local policy controllers comprises, for each iteration:

determining a respective target global policy output for each of one or more of the states in the state-action pairs from the trajectory for the iteration using the optimized local policy controller for the iteration.

16. The method of claim 1, wherein the robotic task has discontinuous dynamics.

17. A system comprising one or more computers and one or more storage devices storing instructions that when executed by the one or more computers cause the one or more computers to perform operations for training a global policy neural network used to select actions to be performed by a robotic agent interacting with a real-world environment to perform a robotic task, wherein the global policy neural network is configured to receive as input an observation characterizing a state of the environment and to generate a global policy output in accordance with current values of a plurality of parameters, and wherein the operations comprise:

initializing a plurality of instances of the robotic task, comprising randomly selecting a respective initial state of the environment for each instance;

for each instance:

generating a trajectory of state-action pairs by selecting actions to be performed by the robotic agent while performing the instance of the robotic task in accordance with current values of the parameters of the global policy neural network, and optimizing a local policy controller that is specific to the instance on the trajectory of state-action pairs for the instance;

generating training data for the global policy neural network using the local policy controllers; and training the global policy neural network on the training data to adjust the current values of the parameters of the global policy neural network.

18. The system of claim 17, wherein each local policy controller receives low-dimensional data characterizing a state of the environment and generates a local policy output, and wherein each observation is high-dimensional data characterizing the state of the environment.

19. One or more non-transitory computer storage media storing instructions that when executed by one or more computers cause the one or more computers to perform operations for training a global policy neural network used to select actions to be performed by a robotic agent interacting with a real-world environment to perform a robotic task, wherein the global policy neural network is configured to receive as input an observation characterizing a state of the environment and to generate a global policy output in accordance with current values of a plurality of parameters, and wherein the operations comprise:

initializing a plurality of instances of the robotic task, comprising randomly selecting a respective initial state of the environment for each instance;

for each instance:

generating a trajectory of state-action pairs by selecting actions to be performed by the robotic agent while performing the instance of the robotic task in accordance with current values of the parameters of the global policy neural network, and optimizing a local policy controller that is specific to the instance on the trajectory of state-action pairs for the instance;

generating training data for the global policy neural network using the local policy controllers; and training the global policy neural network on the training data to adjust the current values of the parameters of the global policy neural network.

20. A method of training a global policy neural network used to select actions to be performed by a robotic agent interacting with a real-world environment to perform a robotic task, wherein the global policy neural network is configured to receive as input an observation characterizing a state of the environment and to generate a global policy output in accordance with current values of a plurality of parameters, wherein the global policy output defines a distribution over a plurality of possible actions, and wherein the method comprises:

initializing a plurality of instances of the robotic task;

for each instance:

generating a trajectory of state-action pairs by selecting actions to be performed by the robotic agent while performing the instance of the robotic task in accordance with current values of the parameters of the global policy neural network, and optimizing a local policy controller that is specific to the instance on the trajectory of state-action pairs for the instance;

generating training data for the global policy neural network using the local policy controllers; and training the global policy neural network on the training data to adjust the current values of the parameters of the global policy neural network.

* * * * *